(12) United States Patent
Kipple

(10) Patent No.: US 11,761,512 B1
(45) Date of Patent: Sep. 19, 2023

(54) BIAXIAL VIBRATION ISOLATION AND DAMPING IN A CONCENTRIC PLURAL-CYLINDER SYSTEM

(71) Applicant: The United States of America, as represented by the Secretary of the Navy, Arlington, VA (US)

(72) Inventor: Blair M. Kipple, Poulsbo, WA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 476 days.

(21) Appl. No.: 16/931,394

(22) Filed: Jul. 16, 2020

(51) Int. Cl.
F16F 15/08 (2006.01)
F16F 3/087 (2006.01)

(52) U.S. Cl.
CPC ............ *F16F 15/08* (2013.01); *F16F 3/0876* (2013.01); *F16F 2224/02* (2013.01); *F16F 2224/025* (2013.01); *F16F 2234/02* (2013.01)

(58) Field of Classification Search
CPC ...... F16F 15/08; F16F 3/0876; F16F 2224/02; F16F 2224/025; F16F 2234/02; F16F 7/104; F16F 7/108; F16L 7/00; F16L 27/10
USPC ....... 248/634, 560, 568, 570, 605, 606, 638, 248/635, 580, 583, 596
See application file for complete search history.

(56) References Cited

U.S. PATENT DOCUMENTS

| | | | |
|---|---|---|---|
| 3,128,978 A | | 4/1964 | Sykes |
| 3,144,919 A | * | 8/1964 | Foote ........................ G05G 5/16 74/502 |
| 4,349,184 A | * | 9/1982 | Peterson ................... F16F 1/38 267/141.1 |
| 4,403,762 A | * | 9/1983 | Cogswell, II ........... F16F 7/108 188/379 |
| 4,765,758 A | * | 8/1988 | O'Donnell .............. F16F 1/371 267/141.1 |
| 5,040,764 A | | 8/1991 | Dubois |
| 5,227,982 A | | 7/1993 | Kipple et al. |
| 5,765,322 A | * | 6/1998 | Kubo ...................... E04H 9/022 248/634 |

(Continued)

*Primary Examiner* — Terrell L McKinnon
*Assistant Examiner* — Michael McDuffie
(74) *Attorney, Agent, or Firm* — Howard Kaiser

(57) ABSTRACT

An exemplary inventive device is placed between inner and outer concentric cylindrical structures. The inventive device includes at least three coaxial rectangular-toroidal elements adhered together, viz., at least one smaller stiff element, at least one larger stiff element, and at least one resilient element. The elements are arranged so that each resilient element is adjacently positioned between a smaller stiff element and a larger stiff element. The inner circumferential surface of the smaller stiff element contacts the outer circumferential surface of the inner cylindrical structure. The outer circumferential surface of the larger stiff element contacts the inner circumferential surface of the outer cylindrical structure. The inner and outer circumferential surfaces of the resilient element are distanced, respectively, from the inner cylindrical structure's outer circumferential surface and the outer cylindrical structure's inner circumferential surface. Mechanically induced deformations of the resilient elements permit longitudinal displacement and result in vibration isolation/damping in biaxial radial directions.

20 Claims, 15 Drawing Sheets

(56) References Cited

U.S. PATENT DOCUMENTS

| | | | | |
|---|---|---|---|---|
| 6,241,062 | B1* | 6/2001 | Enright | F16F 15/08 |
| | | | | 267/136 |
| 6,520,464 | B1* | 2/2003 | Morrissey | F16B 9/056 |
| | | | | 403/348 |
| 6,648,295 | B2* | 11/2003 | Herren | F16F 15/0275 |
| | | | | 248/562 |
| 6,725,985 | B2* | 4/2004 | Haneishi | F16F 15/1442 |
| | | | | 188/379 |
| 7,192,357 | B2* | 3/2007 | Kawakami | F16F 15/10 |
| | | | | 188/379 |
| 9,027,912 | B2* | 5/2015 | Hibi | F16F 1/3828 |
| | | | | 267/141.2 |
| 9,447,833 | B2* | 9/2016 | Choi | F16F 7/108 |
| 10,989,265 | B2* | 4/2021 | Sogawa | F16F 9/18 |
| 11,384,742 | B2* | 7/2022 | Vanhollebeke | F03D 15/00 |
| 11,485,507 | B2* | 11/2022 | Madjlesi | B64D 27/26 |
| 11,603,961 | B2* | 3/2023 | Thomas | B60R 11/04 |
| 2013/0087238 | A1* | 4/2013 | Mercier | B64D 37/32 |
| | | | | 138/118.1 |
| 2014/0151528 | A1* | 6/2014 | Park | F16M 13/02 |
| | | | | 267/141 |
| 2019/0085934 | A1* | 3/2019 | Manzoor | F16F 15/126 |
| 2022/0042571 | A1* | 2/2022 | Miki | H04R 1/288 |

* cited by examiner

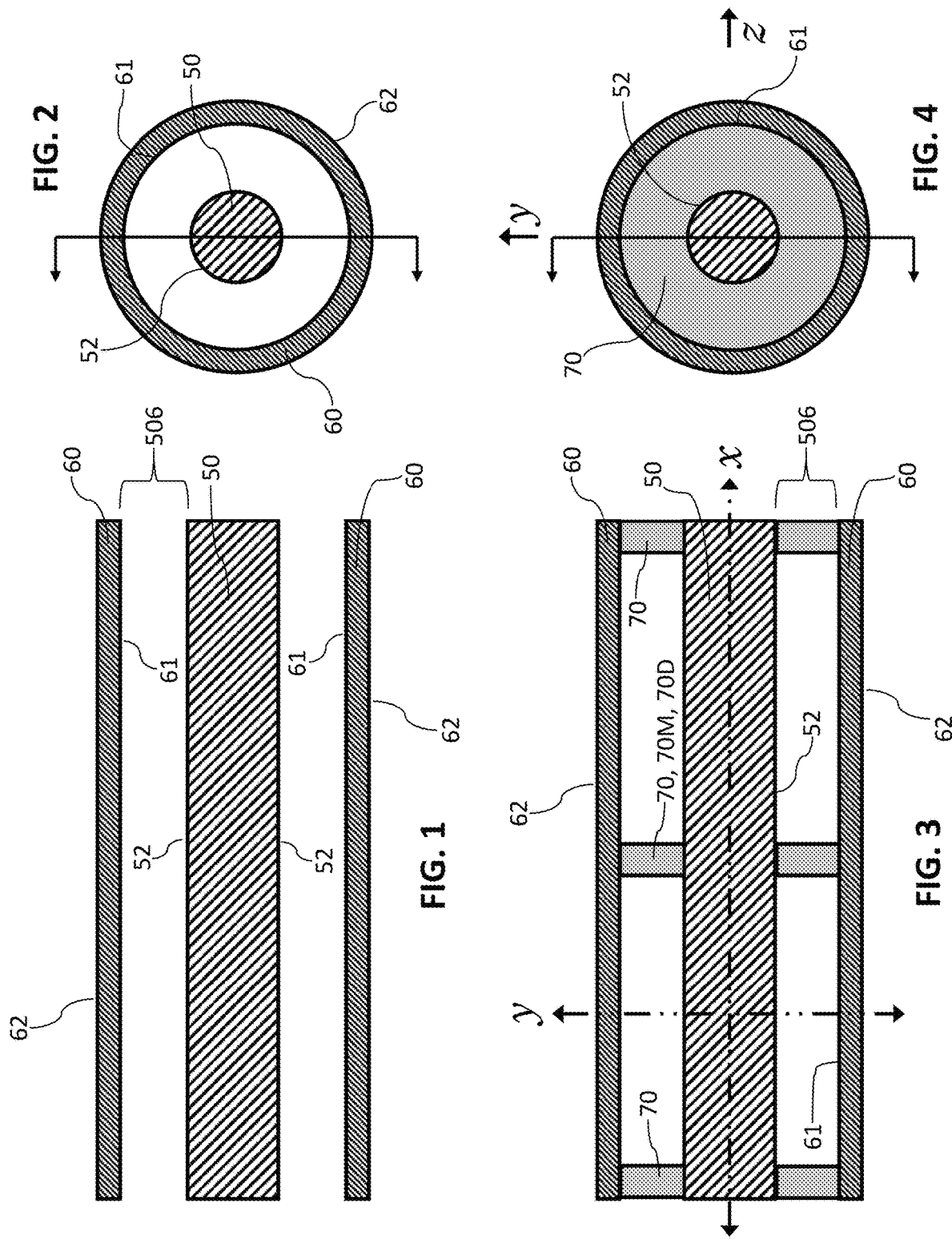

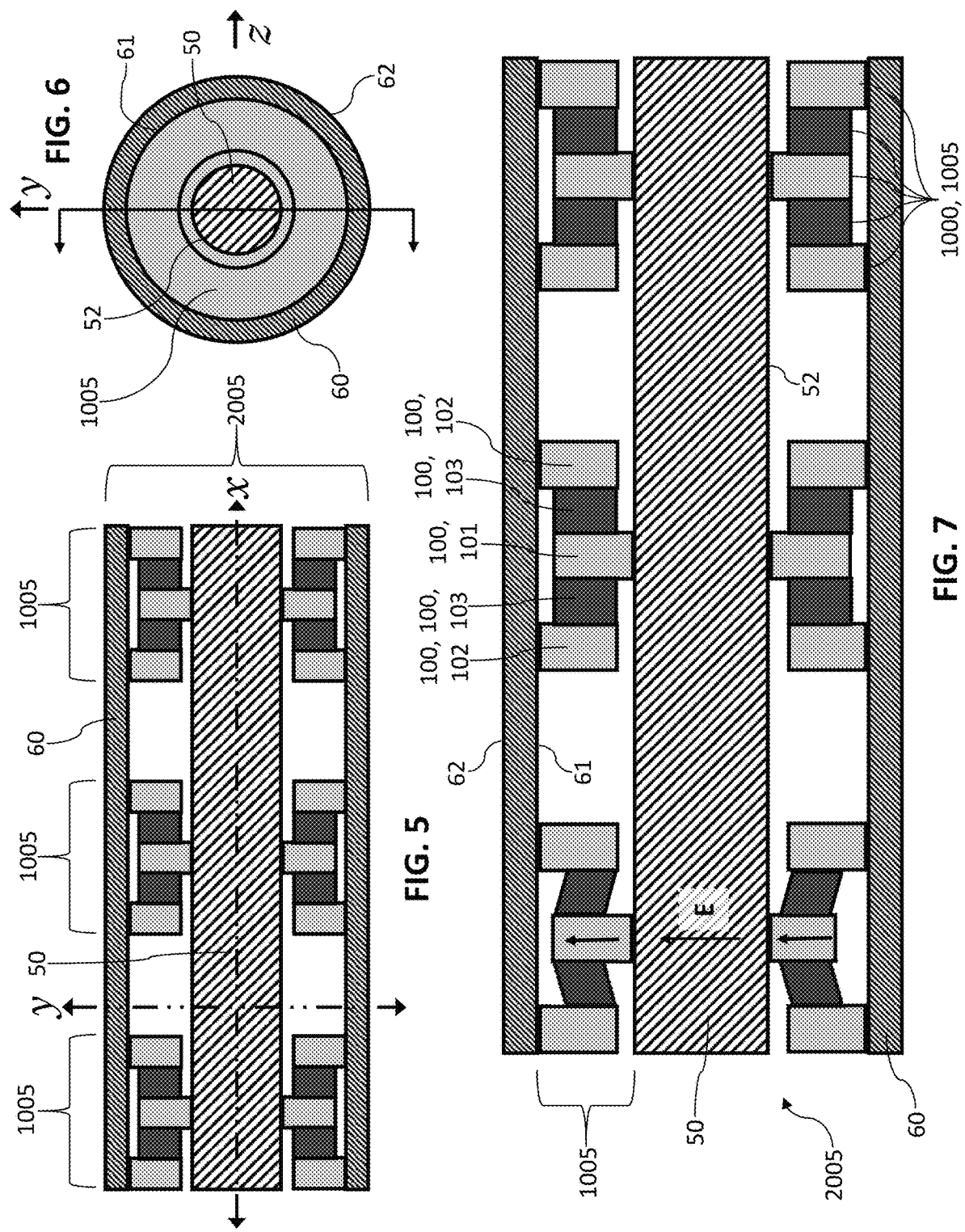

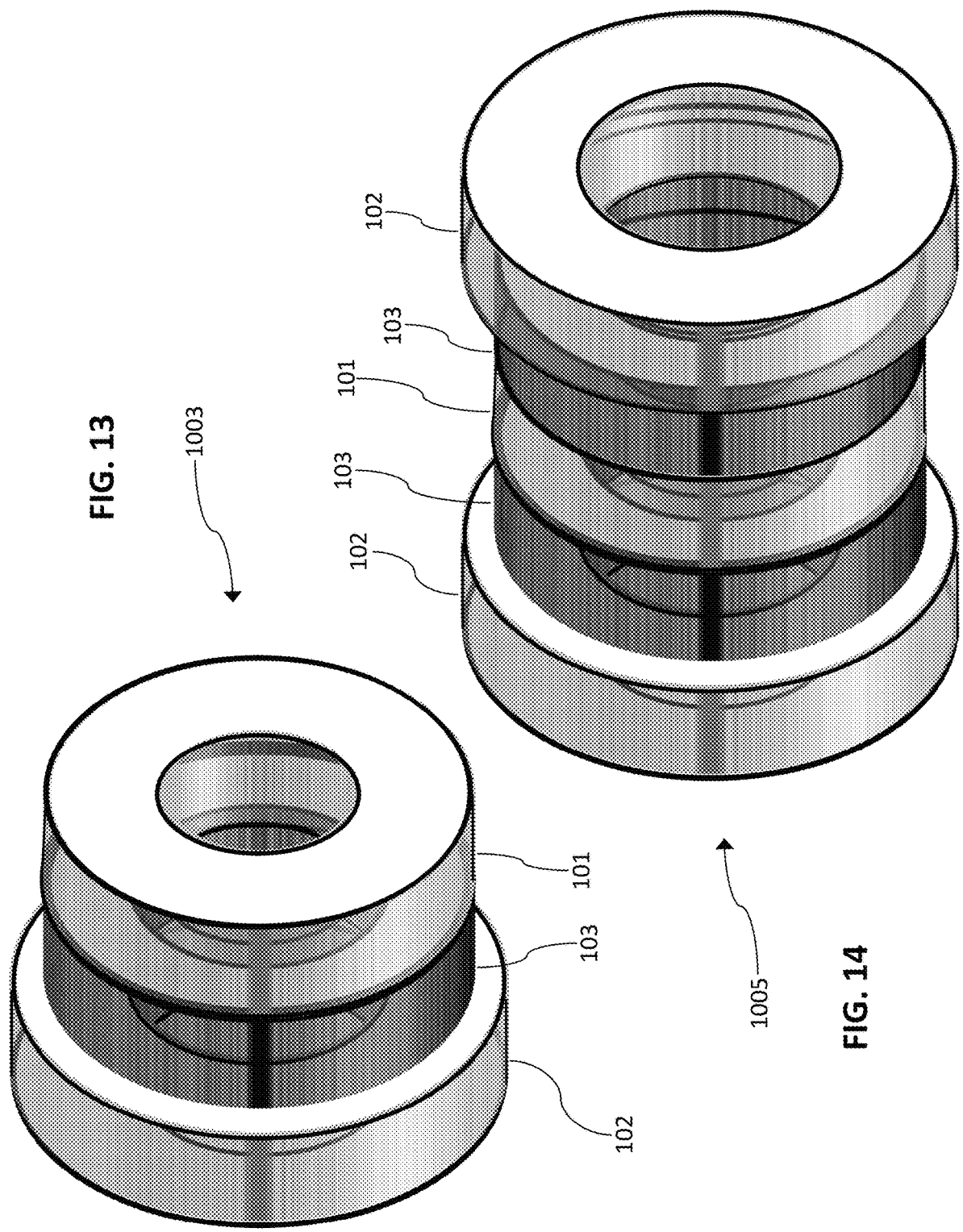

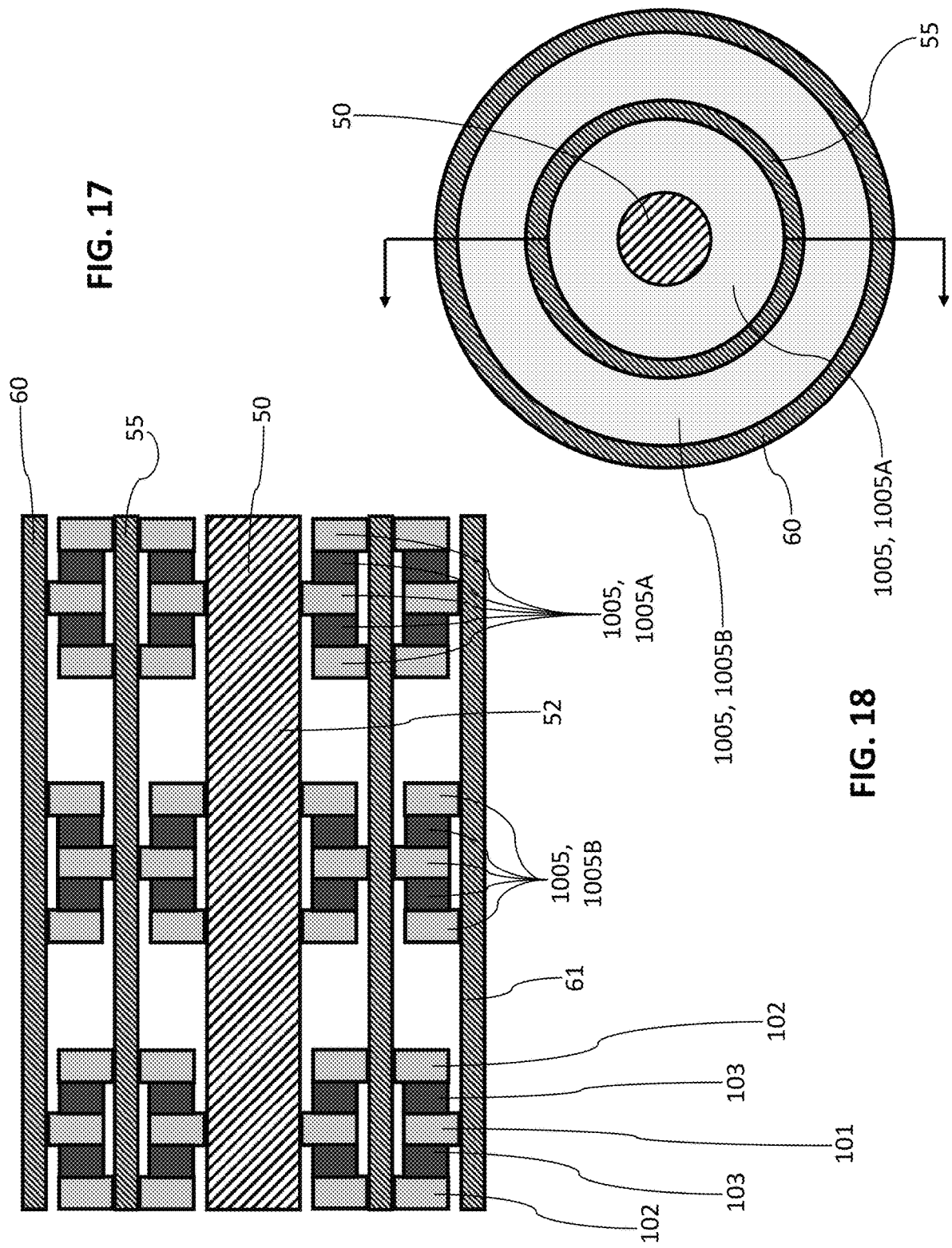

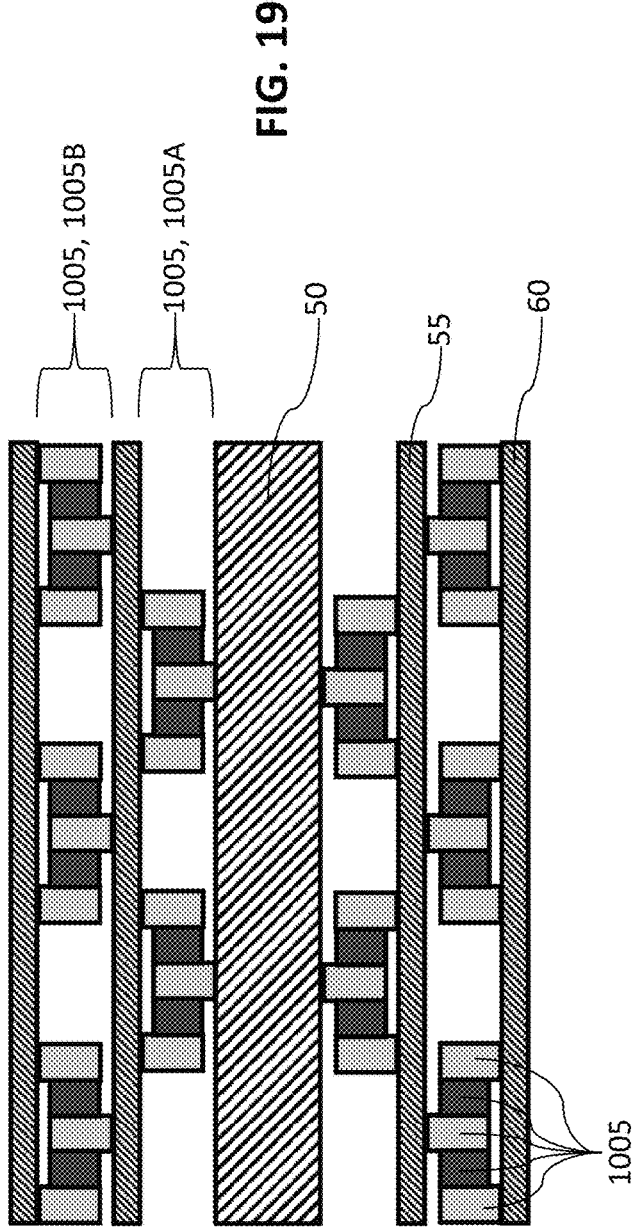
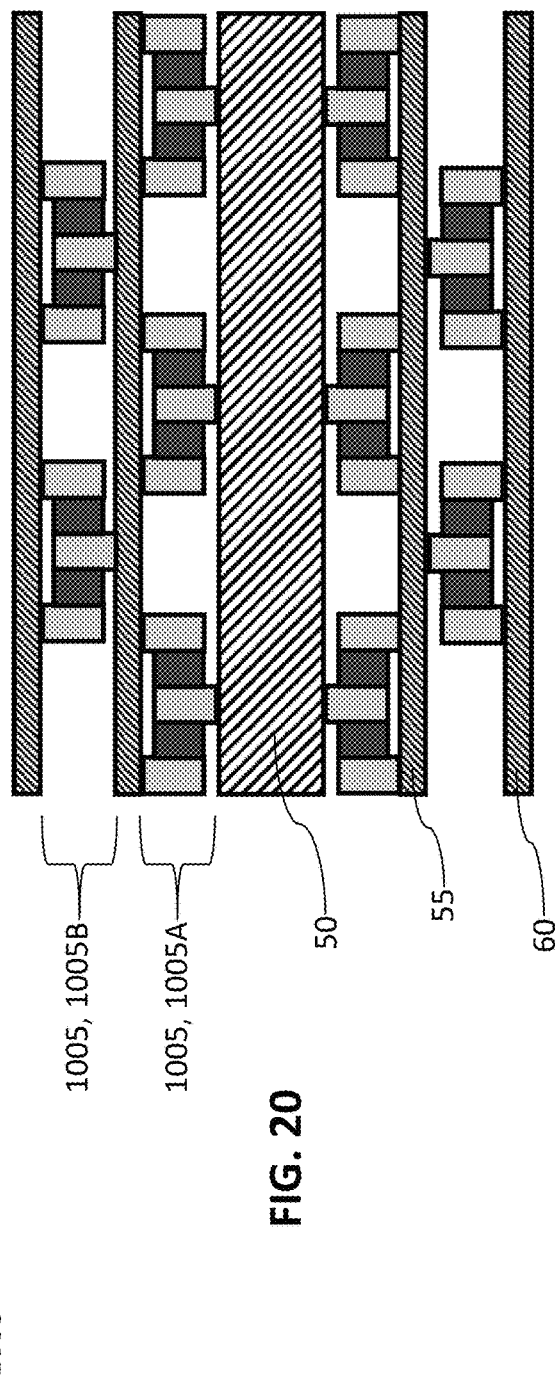

ns along the radial (polar) axes around the concentric cylindrical circumferences of the concentric cylindrical system. Otherwise expressed, let us assume a three-dimensional Cartesian space characterized by three perpendicular axes, viz., x-axis, y-axis, and z-axis, wherein the x-axis is the shared cylindrical longitudinal axis of the concentric cylindrical system, and wherein the y-axis and z-axis each radially project from the x-axis and are at right angles to each other. Exemplary inventive practice attenuates vibration along the y-axis and the z-axis. Furthermore, exemplary inventive practice allows for displacement along the x-axis. If, for instance, a mechanical system functionally requires that two concentric cylindrical structures have freedom of movement in the axial direction, the present invention allows axial movement while still accomplishing vibration isolation along the other axes. Unlike many conventional isolators, the present invention provides vibration isolation and damping on two axes, rather than on a single axis. Exemplary inventive practice accomplishes this isolation using elements that are strained in shear, rather than strained in elongation and contraction. A premise of the present invention is that, for a given mass of damping material, energy dissipation via induction of shear strain is more efficient than in elongation and contraction.

BIAXIAL VIBRATION ISOLATION AND DAMPING IN A CONCENTRIC PLURAL-CYLINDER SYSTEM

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to vibration isolation, more particularly to vibration isolation between concentric cylindrical structures such as pipes, tubes, and shafts.

A conventional vibration isolator performs primarily on a single axis, and is thus limited by its inability to address vibrational displacements along more than one of its axes. For instance, a conventional isolator may rely on compressional or extensional loading of its viscoelastic element along one axis. The conventional isolator may load its resilient element principally in compression/extension in a first axial (e.g., x-axial) direction, but load its resilient element minimally in shear in a second axial (e.g., y-axial) direction. As another example, a conventional isolator may rely on shear loading of its viscoelastic element along one axis. The conventional isolator may load its resilient element principally in shear in a first axial (e.g., y-axial) direction, but load its resilient element minimally in compression/extension in a second axial (e.g., x-axial) direction.

Many applications involving machinery require attenuation of vibrations between concentric cylindrical structures, such as from an inner cylinder to an outer cylinder, or from an outer cylinder to an inner cylinder. A mechanical system may include a vibrating element that is excited into vibration in any number of ways, e.g., via reciprocating machinery, air or water flow, travel over rough surfaces, etc. One may wish to mechanically isolate a vibrating cylindrical structure from a non-vibrating cylindrical structure, wherein the two cylindrical structures are concentric with respect to each other. The vibratory cylindrical structure may be either the smaller (inner) structure or the larger (outer) structure, or both cylindrical structures may be vibratory, e.g., in different ways or degrees. For instance, the outer cylindrical structure may be a thick-walled steel tube, and the inner cylindrical structure may be a solid steel rod.

SUMMARY OF THE INVENTION

In view of the foregoing, an object of the present invention is to provide a better methodology for effecting vibration damping and/or vibration isolation of a vibrating cylindrical structure with respect to another cylindrical structure that is concentric therewith.

Another object of the present invention is to provide a better methodology for effecting vibration damping and/or vibration isolation of a vibrating entity, such as machinery, with respect to a foundation upon which the vibrating entity is mounted.

In accordance with exemplary practice of the present invention, inventively effected isolation mitigates vibration levels, in a secondary structure or foundation, relative to an un-isolated or poorly isolated condition. According to a first mode of practice of the present invention, a vibrating component (e.g., a primary cylindrical structure) is isolated from a non-vibrating component (e.g., a secondary cylindrical structure) that is concentrically located relative to the vibrating component. According to a second mode of practice of the present invention, a vibrating entity (e.g., vibrating machine, vibrating structure, vibrating structural element, vibrating cable, vibrating drill) is isolated from a non-vibrating entity such as a mounting foundation.

Exemplary practice of the inventive first mode attenuates vibratio

In accordance with exemplary practice of the present invention, a vibration isolation and damping device is suitable for use in association with two concentric cylindrical structures, viz., an inner cylindrical structure and an outer cylindrical structure. The inventive isolation/damping device includes at least three coaxially adjacent toroidal elements, viz.: at least one inwardly contiguous non-resilient element; at least one outwardly contiguous non-resilient element; and at least one noncontiguous resilient element. Each noncontiguous resilient element is coaxially interposed between and attached to an inwardly contiguous non-resilient element and an outwardly contiguous non-resilient element. The inventive isolation/damping device is capable of being concentrically combined with two concentric cylindrical structures so that: the inwardly contiguous non-resilient element is contiguous to the inner cylindrical structure; the outwardly contiguous non-resilient element is contiguous to the outer cylindrical structure; and the noncontiguous resilient element is contiguous to neither the inner cylindrical structure nor the outer cylindrical structure.

Also in accordance with exemplary practice of the present invention, a vibration isolator and damper includes two concentric cylindrical structures (viz., an inner cylindrical structure and an outer cylindrical structure) and at least three coaxially adjacent toroidal elements (viz., at least one inwardly contiguous non-resilient element, at least one outwardly contiguous non-resilient element, and at least one noncontiguous resilient element). Each noncontiguous resilient element is coaxially interposed between and attached to an inwardly contiguous non-resilient element and an outwardly contiguous non-resilient element. The at least three coaxially adjacent toroidal elements are concentrically combined with the two concentric cylindrical structures so that: the inwardly contiguous non-resilient element is contiguous to the inner cylindrical structure; the outwardly contiguous non-resilient element is contiguous to the outer cylindrical structure; and the noncontiguous resilient element is contiguous to neither the inner cylindrical structure nor the outer cylindrical structure.

Advantageously, the present invention induces shear in the isolating/damping resilient elements on two axes simultaneously. Inducing shear strain in a resilient element is more efficient than inducing compressional/extensional strain in the resilient element in terms of greater energy loss per mass of damping material employed. Vibration energy loss in a resilient (e.g., viscoelastic) damping material is more efficient when the material is deformed in shear, rather than in elongation.

According to multifarious embodiments and applications of the present invention, the outer cylindrical structure may for instance be the vibrating structure, and it is desirable to isolate the inner cylindrical structure from the vibration emanating from the outer cylindrical structure 60. Instead, the inner cylindrical structure may be the vibrating structure, and it is desirable to isolate the outer cylindrical structure from the vibration emanating from the inner cylindrical structure. For example, the inner cylindrical structure may be a mechanical piece of equipment (e.g., motor, gearbox, pump, or transmission) that one wishes to isolate from an outer cylindrical structure (e.g., a housing or shell). The vibrating inner cylindrical structure (e.g., a rod or cable) may be required to have freedom of movement along the long axis of the inventive isolator, if such longitudinal movement is a necessary characteristic of the mechanical system, for instance wherein a cable or drill rod must move longitudinally relative to a fixed outer tubular housing.

BRIEF DESCRIPTION OF THE DRAWINGS

The present invention will now be described, by way of example, with reference to the accompanying drawings, wherein:

FIGS. 1 and 2 are side (longitudinal side) and end (axial end) cross-sectional views, respectively, of an example of two concentric structures, viz., an inner cylindrical structure and an outer cylindrical structure.

FIGS. 3 and 4 are side and end cross-sectional views, respectively, of the inner and outer concentric structures shown in FIGS. 1 and 2, additionally showing mechanical parts between the inner cylindrical structure and the outer cylindrical structure.

FIGS. 5 through 7 are side and end cross-sectional views of an example of a vibration damping/isolation apparatus and configuration in accordance with the present invention. FIG. 7 is the side view of FIG. 5 as enlarged and depicting deformation of inventive resilient elements.

FIGS. 12 and 13 are perspective views of an example of an inventive vibration damping/isolation unit such as shown in FIG. 9. In FIG. 12 the three coaxial elements are shown separated in the nature of an exploded view. In FIG. 13 the three coaxial elements are shown attached.

FIG. 14 is a perspective view of an example of an inventive vibration damping/isolation unit such as shown in FIG. 8. In FIG. 14 the five coaxial elements are shown joined together.

FIGS. 15 through 21 are side and end cross-sectional views of other examples of a vibration damping/isolation apparatus and configuration in accordance with the present invention. FIG. 15 shows an example of an inventive system that includes an inventive vibration damping/isolation unit having nine joined coaxial elements. FIG. 16 shows an example of an inventive system that includes an inventive vibration damping/isolation unit having thirteen joined coaxial elements. FIGS. 17 and 18 are two views showing an example of an inventive system that includes two rows of three invention vibration damping/isolation units each having five joined coaxial elements. FIGS. 19 and 20 respectively show two other examples of an inventive system that includes two rows of three inventive vibration damping/isolation units each having five joined coaxial elements. FIG. 21 shows an example of an inventive system that includes an inventive vibration damping/isolation unit having seventeen joined coaxial elements.

FIG. 22 shows one inventive vibration damping/isolation unit having three joined coaxial elements.

Figure 8:
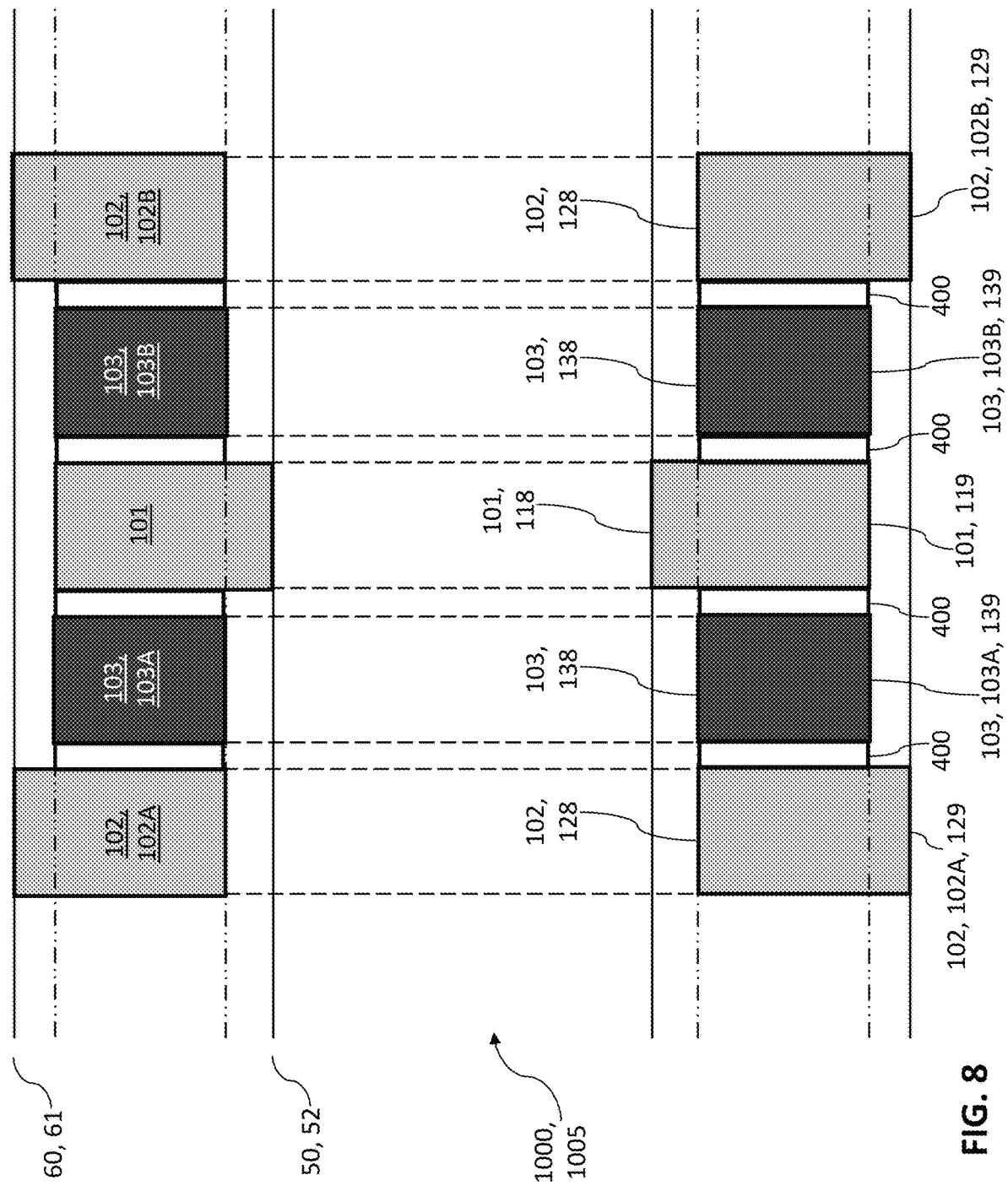
FIG. 8 is a cross-sectional view of an example of a five-element vibration damping/isolation unit in accordance with the present invention, such as the inventive five-element vibration damping/isolation unit shown in FIGS. 5 and 7.

DESCRIPTION OF EXEMPLARY
EMBODIMENTS OF THE INVENTION

Referring now to FIGS. 1 through 4, let us assume that coaxial cylindrical structures 50 and 60 are parts or components of larger machinery, and that it is desirable to attenuate the transmission of vibration from inner cylinder 50 to outer cylinder 60, and/or from outer cylinder 60 to inner cylinder 50. In this arrangement, outer cylinder 60 is hollow and inner cylinder 50 is coaxially situated inside outer cylinder 60. Inner cylinder 50 has an outer cylindrical surface 52. Outer cylinder 60 has in inner cylindrical surface 61 and an outer cylindrical surface 62. Inner cylinder 50 may be solid or hollow or some combination thereof. Depending on the machinery, the space 506 between outer cylinder 60's inner surface 61 and inner cylinder 50's outer surface 52 may be empty or may be filled (e.g., with a fluid), such as diagrammatically illustrated in FIGS. 1 and 2. Space 506 may also contain therein one or more mechanical structures 70, such as diagrammatically illustrated in FIGS. 3 and 4.

The present inventor considered the possibility of implementing individual damping elements between inner cylinder 50 and outer cylinder 60. For illustrative purposes, let us consider the items designated "70" in FIGS. 3 and 4 to be damping elements 70D, rather than mechanical structures 70M that are part of the machinery. For instance, element 70D is a rectangular toroidal shaped element mainly serving the purpose of isolating vibration transmission between inner cylinder 50 and outer cylinder 60. An isolation approach involving use of separate single elements 70D between inner cylinder 50 and outer cylinder 60, such as shown in FIGS. 3 and 4, is inevitably deficient for many applications. Axial directions x and y are perpendicular to each other. If an element 70D is made of a rigid or stiff material, such as a metal or metal alloy, then it will tend to less effectively isolate vibrations in the transverse (radial) axial directions y and z. On the other hand, if an element 70D is made of a resilient or flexible or elastic material, such as an elastomer, then it will tend to more effectively isolate vibrations in the transverse (radial) axial direction y and z.

Mechanical connecting elements 70M may be, for instance, disc-shaped (such as shown in FIGS. 3 and 4), rectangular, wedge-shaped, etc. If mechanical elements 70M are made of a hard material (e.g., steel, aluminum, plastic, or a hard viscoelastic rubber), then little to no vibration isolation occurs and vibration energy readily transfers from cylinder 50 to cylinder 60, resulting in undesirable vibration levels at cylinder 60. If mechanical elements 70M are made of a soft (e.g., elastic, viscoelastic, elastomeric, or flexible) material, then mechanical elements 70M respond only in an extensional mode, i.e., tension and compression of the mechanical element. In this case, energy loss in mechanical element 70 occurs primarily due to cyclical extension and compression of the mechanical element, and the stiffness of the mechanical element is dictated by the Young's modulus of the soft material.

With reference to FIGS. 5 through 14, exemplary practice of an inventive damping unit 1000 features, inter alia, a combination including at least one resilient element and at least two non-resilient elements, and the configuration thereof in such a way as to impart biaxial vibration isolation to a plural coaxial cylindrical system. An inventive damping unit 1005, such as shown in FIGS. 5 through 8 and 14, is characterized by the unification or integration of five elements 100. According to frequent practice of the present invention, each resilient element is made of an elastomeric material, and each non-resilient element 100 is made of a non-elastomeric material.

Figure 15:
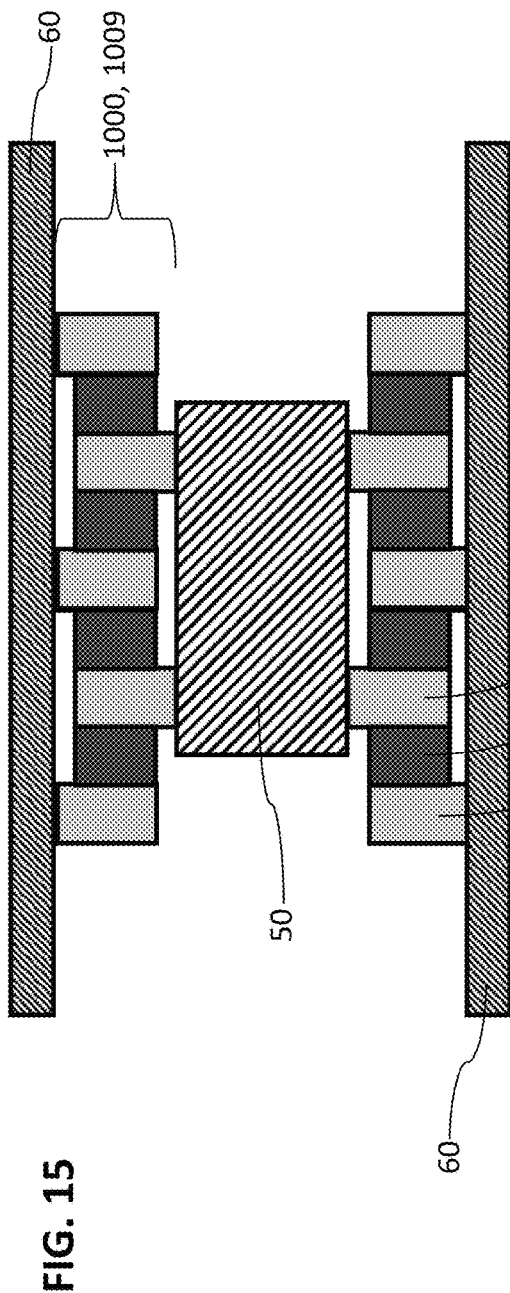
Figure 16:
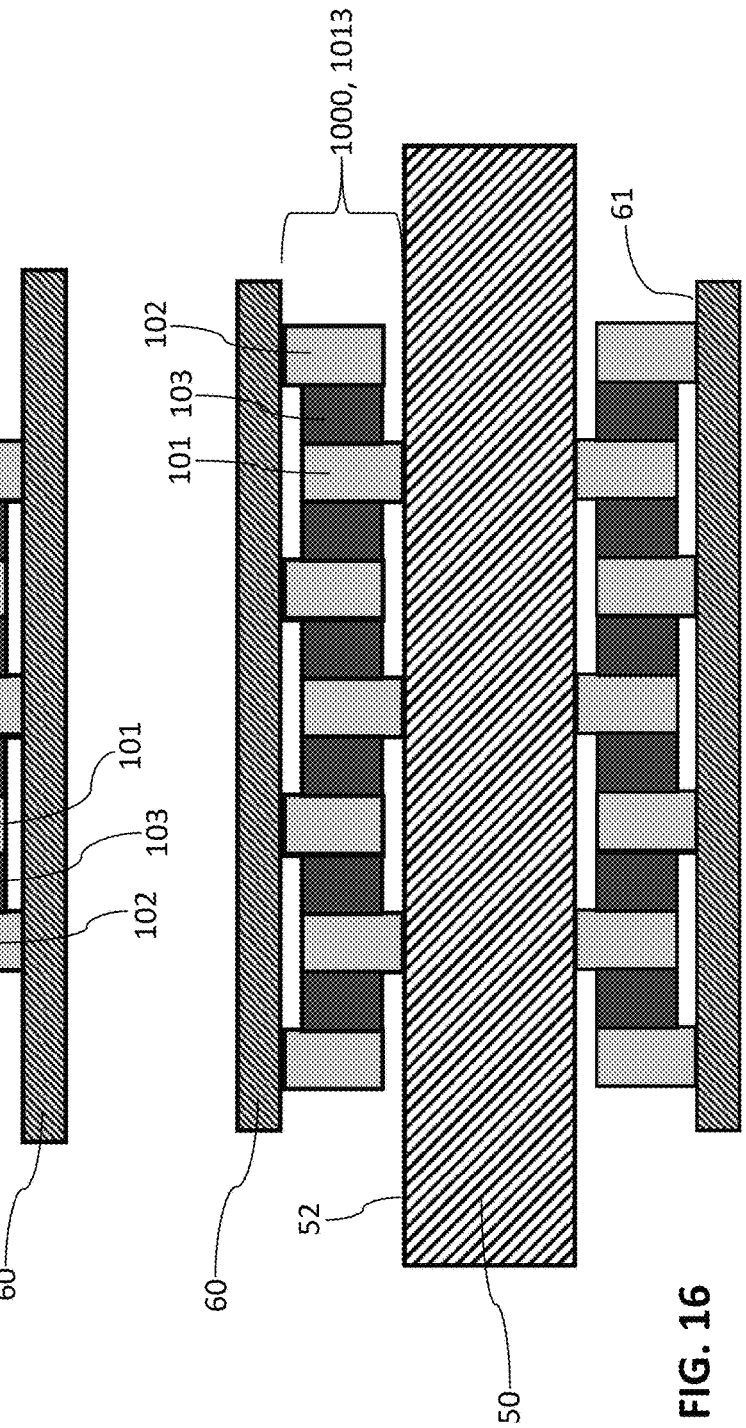
Figure 21:
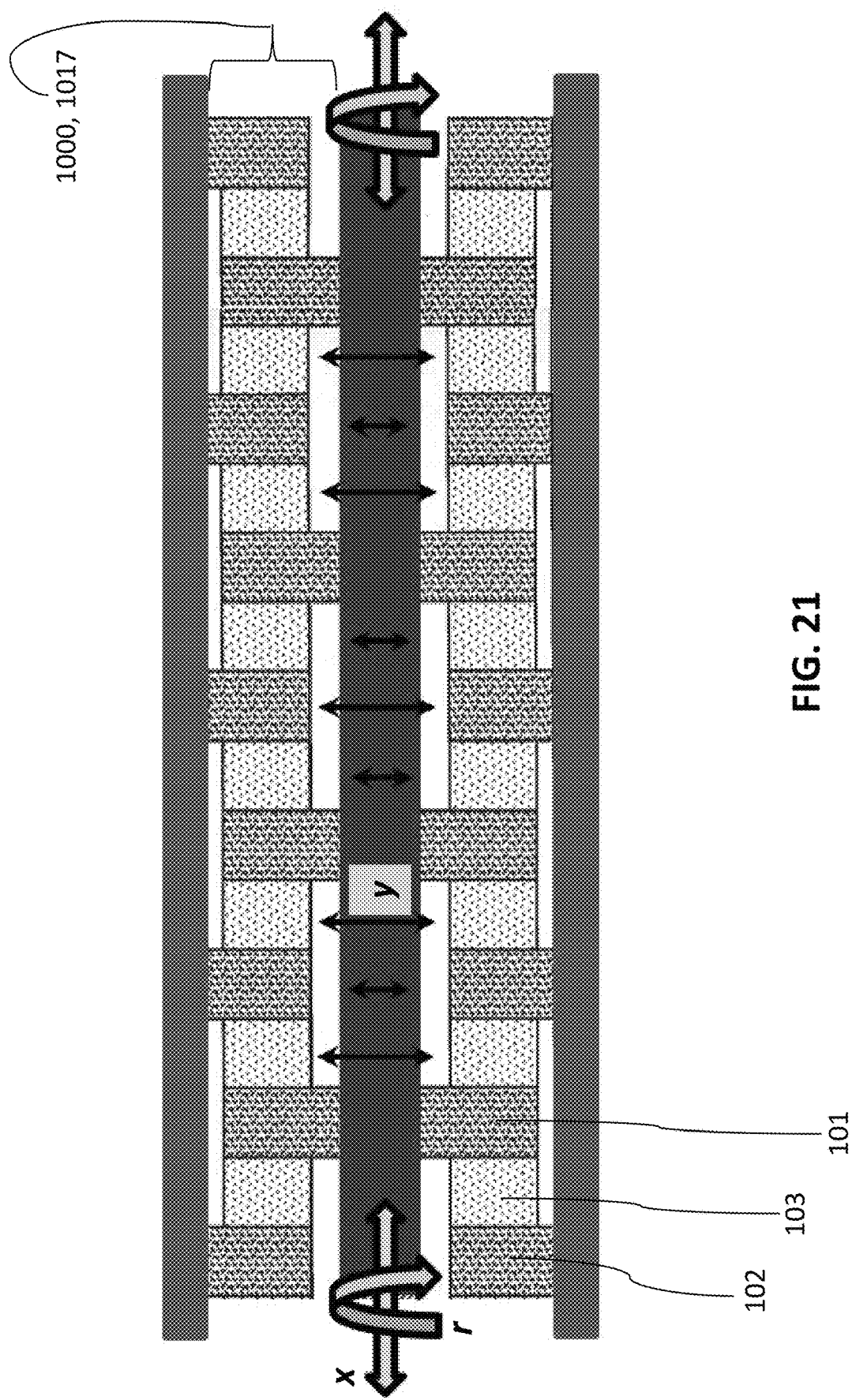

As shown in FIGS. 5 through 8 and 14, an exemplary embodiment of an inventive isolation/damping unit 1005 includes five elements, viz., a non-resilient (e.g., hard, stiff, or rigid) element 101, two non-elastomeric (e.g., hard, stiff, or rigid) elements 102, and two resilient (e.g., resilient, flexible, or elastic) damping elements 103. The five elements of an inventive damping unit 1005 are symmetrically arranged and joined whereby, in the longitudinal direction x, non-resilient element 101 is located in the middle, two non-resilient elements 102 are located at the respective ends, and two resilient damping elements 103 are each located between non-resilient element 101 and a non-resilient element 102. As shown in FIGS. 5 and 7, elements 100 are grouped into individual inventive units 1005 so that three inventive units 1005 are spaced apart along longitudinal cylindrical axis x. More generally, the present invention may be embodied to provide for a single inventive unit 1000 (such as shown in FIGS. 15, 16, and 21), or for a plurality of inventive units 1000 (such as shown in FIGS. 5, 6, 17, 19, and 20) that are spaced apart along the axial length x of the concentric cylindrical system.

Figure 9:
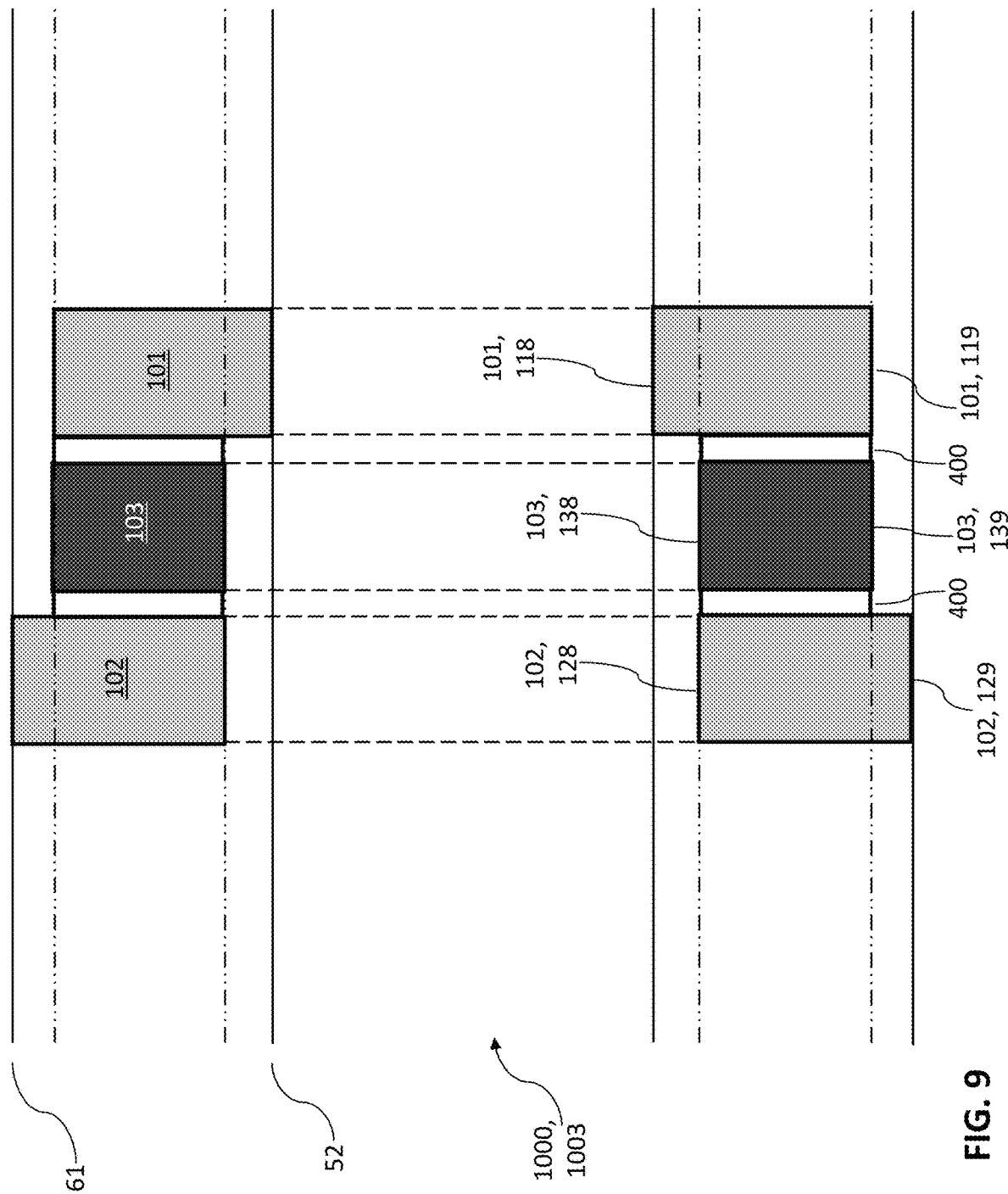
FIG. 9 is a cross-sectional view of an example of a three-element vibration damping/isolation unit in accordance with the present invention.

The basic mode of practice of an inventive damping unit 1000 is represented by inventive damping unit 1003, which has three elements 100, such as shown in FIG. 9. Inventive damping unit 1003 includes non-resilient element 101, non-resilient element 102, and resilient damping element 103, which is intermediate non-resilient element 101 and non-resilient element 102. Inventive practice of damping unit 1000 admits of a wide range of numbers of elements 100. Inventive damping units having greater numbers of elements 100 than three, such as inventive damping unit 1005 shown in FIGS. 5 through 8 and 14, may be more suitable than inventive damping unit 1003 for many applications.

Particularly as shown in FIG. 8, non-resilient element 101 is the medial element, and non-resilient elements 102 are the two extreme elements. Resilient damping element 103A is placed between non-resilient element 101 and non-resilient element 102A. Similarly, resilient element 103B is placed between non-resilient element 101 and non-resilient element 102B. Non-resilient element 101 has an inner cylindrical surface 118 and an outer cylindrical surface 119. Inner cylindrical surface 118 of non-resilient element 101 adjoins the outer cylindrical surface 52 of inner cylinder 50. Outer cylindrical surface 119 of non-resilient element 101 is separated (distanced) from the inner cylindrical surface 61 of outer cylinder 60. Regarding each non-resilient element 102, the inner cylindrical surface 128 is separated (distanced) from the outer cylindrical surface 52 of inner cylinder 50; the outer cylindrical surface 129 adjoins the inner cylindrical surface 61 of outer cylinder 60. Regarding each resilient element 103, the inner cylindrical surface 138 is separated (distanced) from the outer cylindrical surface 52 of inner cylinder 50; the outer cylindrical surface 139 is separated (distanced) from the inner cylindrical surface 61 of outer cylinder 60.

Inventive damping unit 1000 includes four adhesive layers 400, each situated between an resilient damping element 103 and a non-resilient element 101 or 102. Non-resilient element 101 is attached (e.g., adhered) on one side to resilient element 103A via an adhesive layer 400, and is attached (e.g., adhered) on the opposite side to resilient element 103B via an adhesive layer 400. Resilient damping element 103A is attached, on its more extreme side, to non-resilient element 102A via an adhesive layer 400. Resilient damping element 103B is attached, on its more extreme side, to non-resilient element 102B via an adhesive layer 400.

Figure 10:
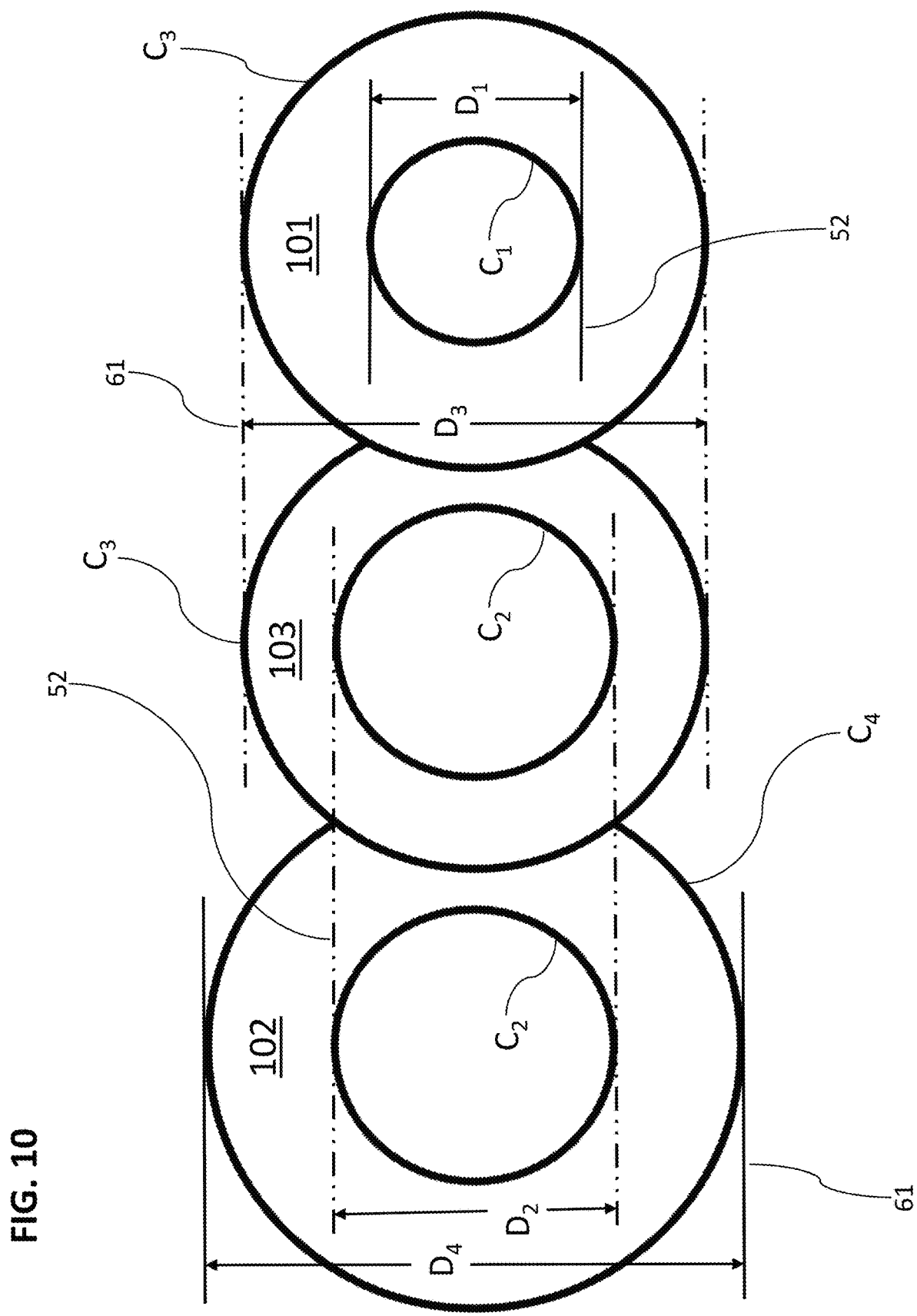
FIGS. 10 and 11 are diagrammatic views comparatively illustrating, by way of example, the diametric and circumferential dimensions of three different coaxial elements of an inventive vibration damping/isolation unit such as shown in FIG. 9.
Figure 11:
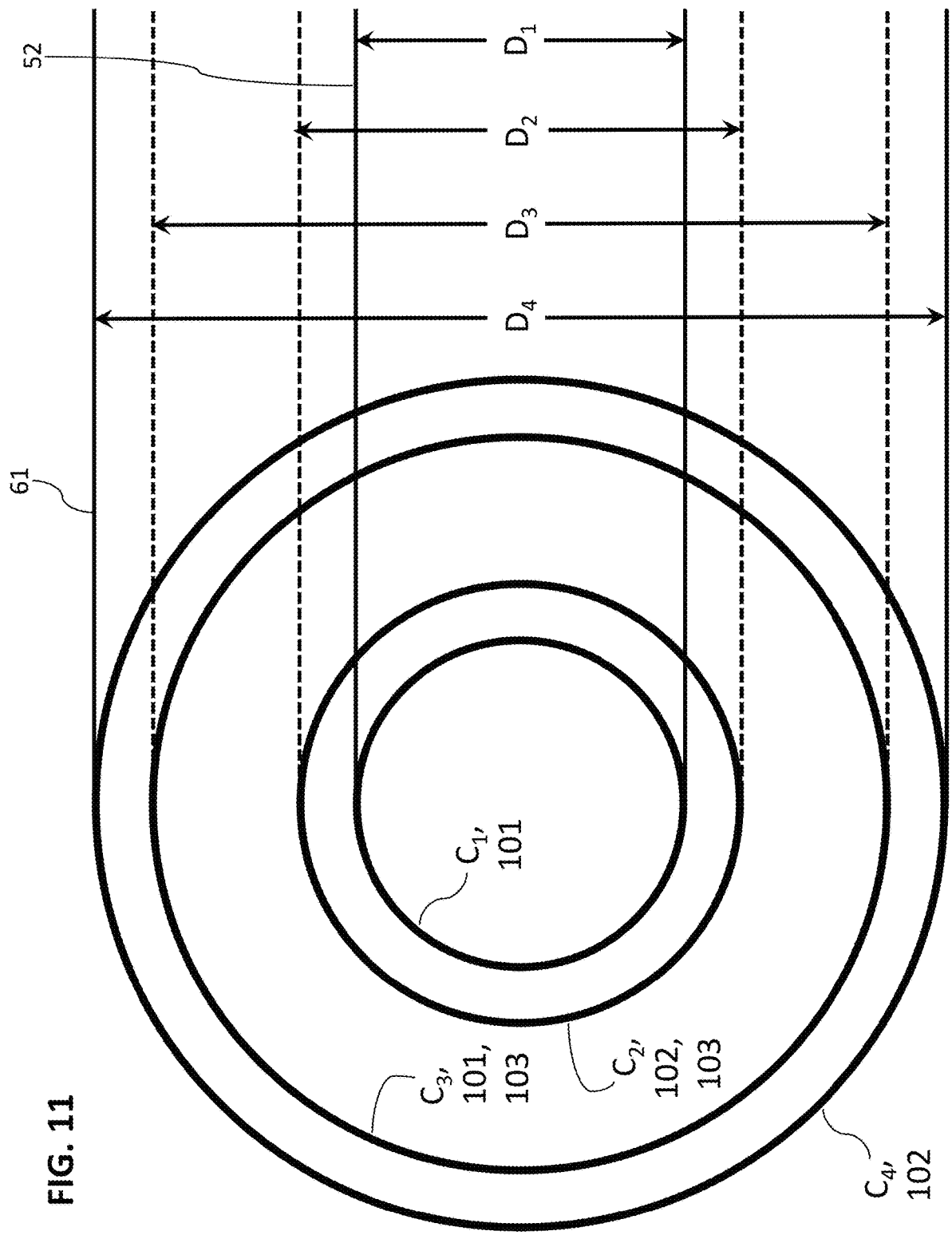
Figure 12:
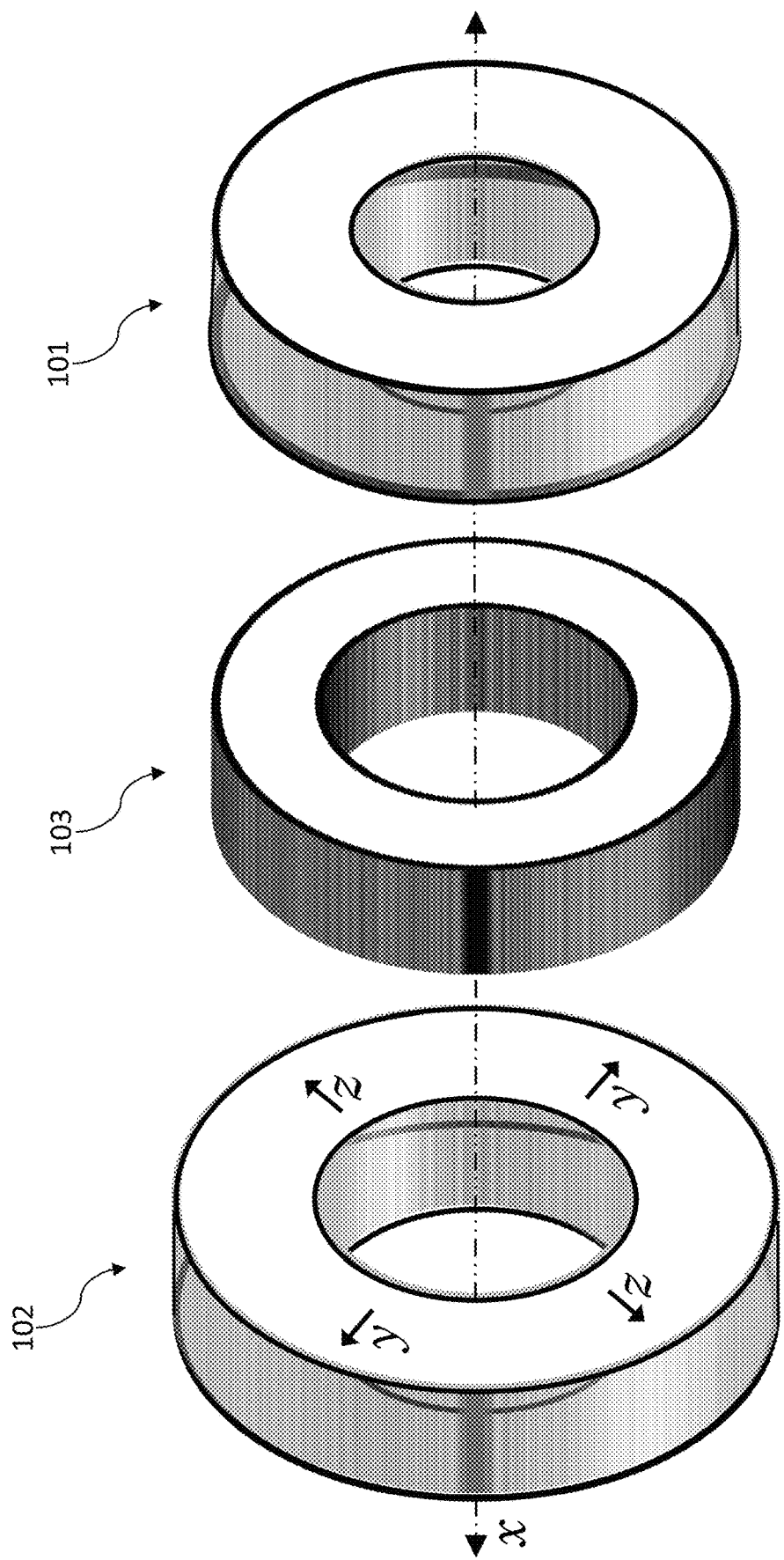

The respective inner cylindrical surfaces 138 of resilient damping element 103 are even with the respective inner cylindrical surfaces of non-resilient element 102. The respective outer cylindrical surfaces 139 of resilient damping element 103 are even with the outer cylindrical surface 119 of non-resilient element 101. As shown in FIGS. 10 and 11, the outer cylindrical surface 52 of inner cylinder 50 and the inner cylindrical surface 118 of non-resilient element 101 each describe the same circumference $C_1$ and the same diameter $D_1$. The inner cylindrical surface 128 of non-resilient element 102 and the inner cylindrical surface 138 of resilient damping element 103 each describe the same circumference $C_2$ and the same diameter $D_2$. The outer cylindrical surface 119 of non-resilient element 101 and the outer cylindrical surface 139 of resilient damping element 103 each describe the same circumference $C_3$ and the same diameter $D_3$. The inner cylindrical surface 61 of outer cylinder 60 and the outer cylindrical surface 129 of non-resilient element 102 each describe the same circumference $C_4$ and the same diameter $D_4$.

An exemplary inventive device is capable of attenuating vibration of a cylinder in the radial axes (e.g., the y and z axes), and is capable of allowing for displacement of a cylinder in the longitudinal axis (e.g., the x-axis). An important principle underlying the present invention is that vibration energy loss in a viscoelastic damping material is often more efficient (greater energy loss per mass of damping material employed) when the viscoelastic material is deformed in shear, rather than in elongation. The present invention takes advantage of this kind of shear strain-induced damping mechanism by employing one or more devices that each include at least three elements and that are designed to strain in shear when, for instance, vibration from a rotating or reciprocating cylinder 50 occurs relative to a stationary cylinder 60, which is concentric with cylinder 50.

As shown in FIGS. 5 through 8 and 14, inventive damping unit 1005 includes five elements 100. Vibration from the moving inner cylinder 50 couples into rigid or non-resilient (e.g., inelastic, or non-viscoelastic, or non-elastomeric, or inflexible) element 101, and each rigid element 102 is isolated from rigid element 101 by a resilient (e.g., elastic, viscoelastic, elastomeric, or flexible) damping element 103. Otherwise expressed, the inventive device 1005's medial element, viz., rigid element 101, is coupled to and moving with the vibrating inner cylinder 50. Each non-resilient element 102 is restrained by the relatively massive and stiff cylinder 60. Elements 101, 102, and 103 are annular or ring-shaped discs joined together, for instance bonded together on their respective faces with an adhesive 400. The terms "rigid" and "non-resilient" are used interchangeably herein.

Let us consider a situation in which there is vibration displacement of inner cylinder 50, creating upward displacement of non-resilient element 101, such as indicated by arrow E in FIG. 7. Since each non-resilient element 102 is fixed to the relatively massive and stiff outer cylinder 60, shear strain is induced in resilient damping elements 103. Non-resilient elements 101 and 102 must be substantially stiffer in shear than resilient elements 103, to ensure that shear strain is induced primarily into resilient elements 103. Further, adhesive 400 (which bonds the elements together) should have a shear modulus greater than that of the resilient damping elements 103, to ensure that the relatively soft adhesive does not compromise the inducement of shear strain into the resilient damping elements 103. This system may be thought of as a form of mass spring damper system where the stiffness of resilient damping element 103 in shear is dictated by its geometry and by the shear modulus of the resilient (e.g., viscoelastic) material that of which it is composed.

Non-resilient elements 101 and 102 can be composed of any number of materials. According to exemplary inventive practice, the non-resilient material(s) of elements 101 and 102 must be bondable, such as by using an adhesive 400, to the resilient material(s) of damping element 103. In addition, depending on the inventive embodiment, non-resilient element 101 may be bonded to inner cylinder 50, and/or non-resilient element 102 may be bonded to outer cylinder 60. In testing performed by the present inventor, good performance was obtained when none of the non-resilient elements was bonded to a cylinder. Each non-resilient element 101 was bearing upon inner cylinder 50, and each non-resilient element 102 was bearing upon outer cylinder 60.

Let us suppose that there is transverse vibration of inner cylinder 50. If the vibration characteristics of inner cylinder 50 are sufficiently known in terms of vibration frequency and spatial wave number, this system may be tuned while taking into consideration the tuned resonance of each individual element 100 by tailoring its shear stiffness, and also taking into consideration the axial spacing of elements 100 along the length of inner cylinder 50. FIG. 21 illustrates, by way of example, an inventive isolation/damping unit 1000 that is characterized by a continuous series of many discrete elements 100, viz., inventive isolation/damping unit 1017 having seventeen discrete elements 100. Resilient damping elements 103 shown in FIG. 21 are the isolative shear elements. The vibrating inner cylinder 50 is free to translate in axial-longitudinal direction x and to rotate in circumferential direction r. An inventive prototype similar to that shown in FIG. 21 performed well in testing.

Many applications of the present invention are possible in which the internal component, such as inner cylinder 50, is the source of vibration. The present invention can provide isolation between the internal component and its housing. Or, the present invention can act as a support point along its length, so as to not only provide vibration isolation but also mechanically damp vibration of the internal component, such as shown by way of example in FIG. 21. These types of applications include drive shafts in housings, drills in housings, and cables in housings. In the case of a rotating inner cylindrical component 50 as a drive shaft or drill shaft, non-resilient element 101 can be designed to embody or incorporate a bushing or bearing to allow for rotation of the inner cylindrical component 50, which non-resilient element 101 circumscribes or encompasses.

In the case of a cable or shaft that must be free to move longitudinally in a housing, non-resilient element 101 can be designed with sufficient hardness to resist wear from longitudinal travel of inner cylindrical component 50. Furthermore, the present invention can be embodied to accommodate simultaneous rotation and longitudinal travel of the inner cylindrical component 50, such as in the case of an advancing drill shaft. In fact, the mode in which this invention was tested allowed for both rotation and longitudinal travel of the inner element while providing 25 to 40 dB of vibration attenuation in the outer housing relative to the un-isolated case.

There are other potential applications of the present invention in which the inner cylinder 50 is vibrating. These include, for instance, a vibrating shaft within a housing or structure, such as propulsion shaft on a ship or other vehicle, such as depicted in FIG. 16; or a motor, gearbox, transmission, etc., that is housed in a shell or like structure, such as depicted in FIG. 15. For applications of the present invention in which a machine within a housing presents both a vibration problem and an airborne noise problem, the housing can be designed as an airborne noise baffle/enclosure, similar to what is shown in FIG. 15, but enclosed at the ends. Hence, the enclosure serves the purpose of both a cylindrical "bedplate" and an airborne noise enclosure with flexible penetrations, likely located in the ends, that allow passage of cable, tubing, piping, etc.

Figure 22:
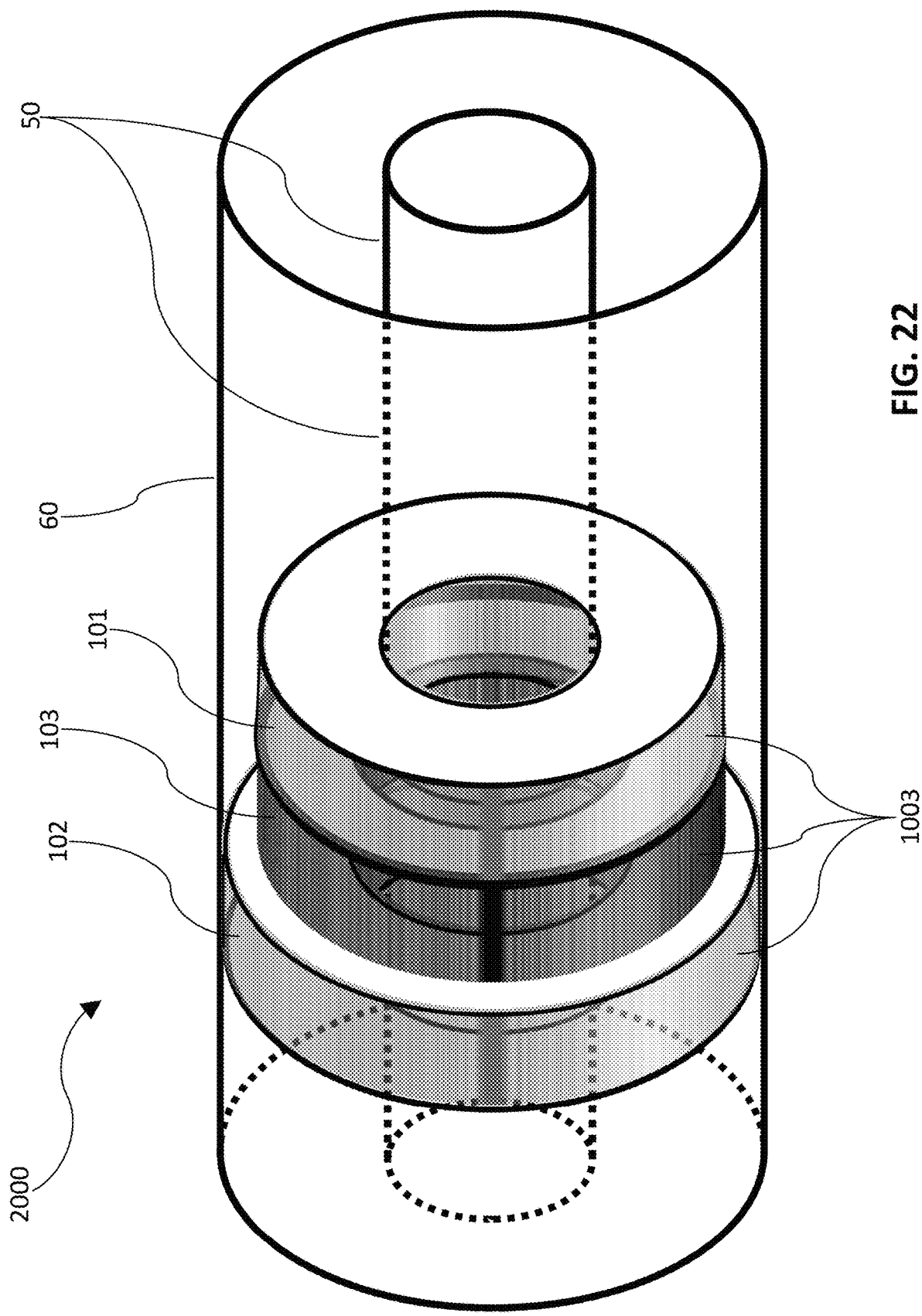
FIG. 22 is a perspective view showing, by way of example, an inventive vibration damping/isolation combination including two concentric cylindrical structures and at least one inventive vibration damping/isolation unit connecting (e.g., radially interposed between) the two concentric cylindrical structures. For illustrative purposes.
Figure 23:
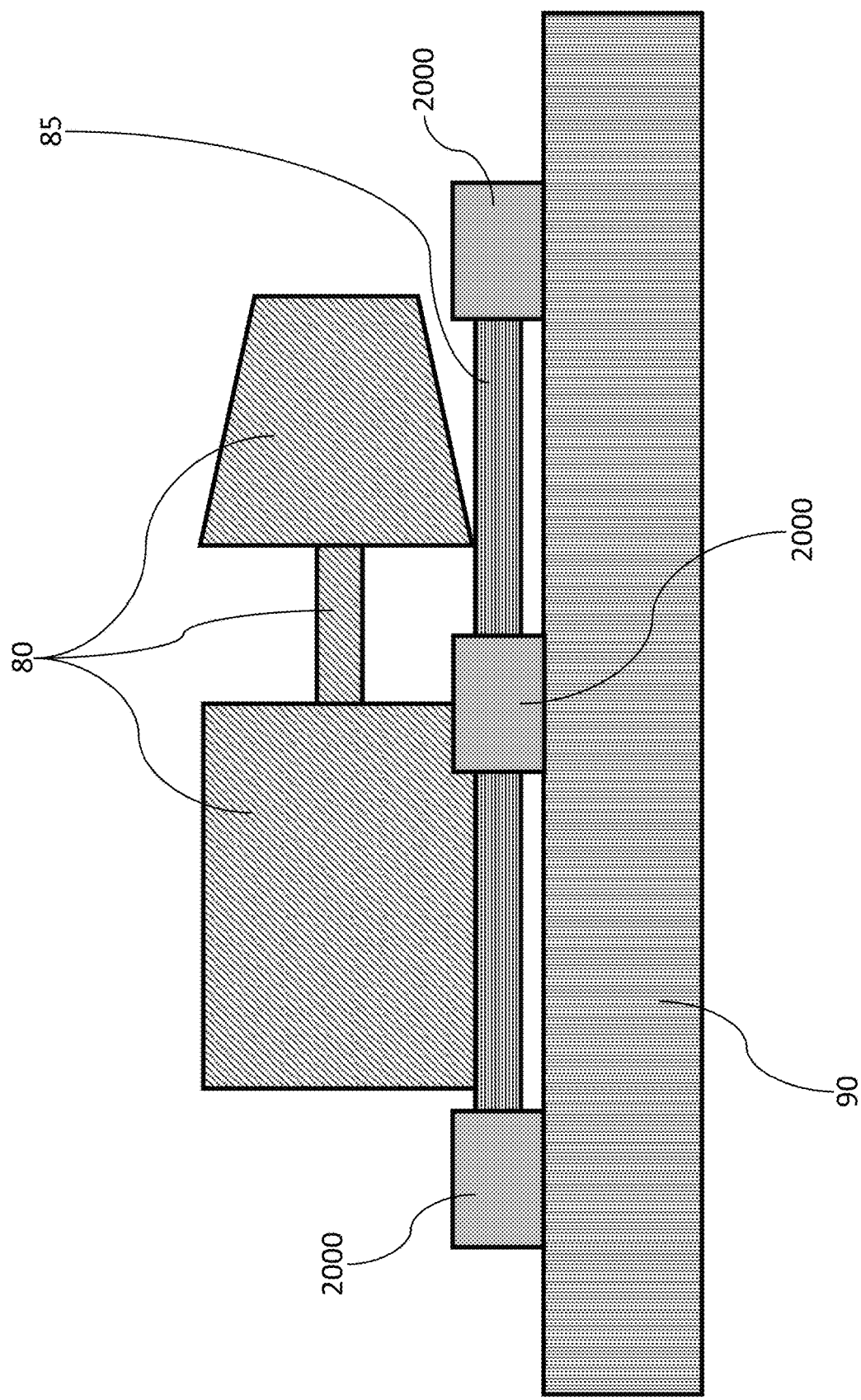
FIG. 23 is an elevation view of an example of implementation of inventive vibration damping/isolation combinations such as shown in FIG. 22.
Figure 25:
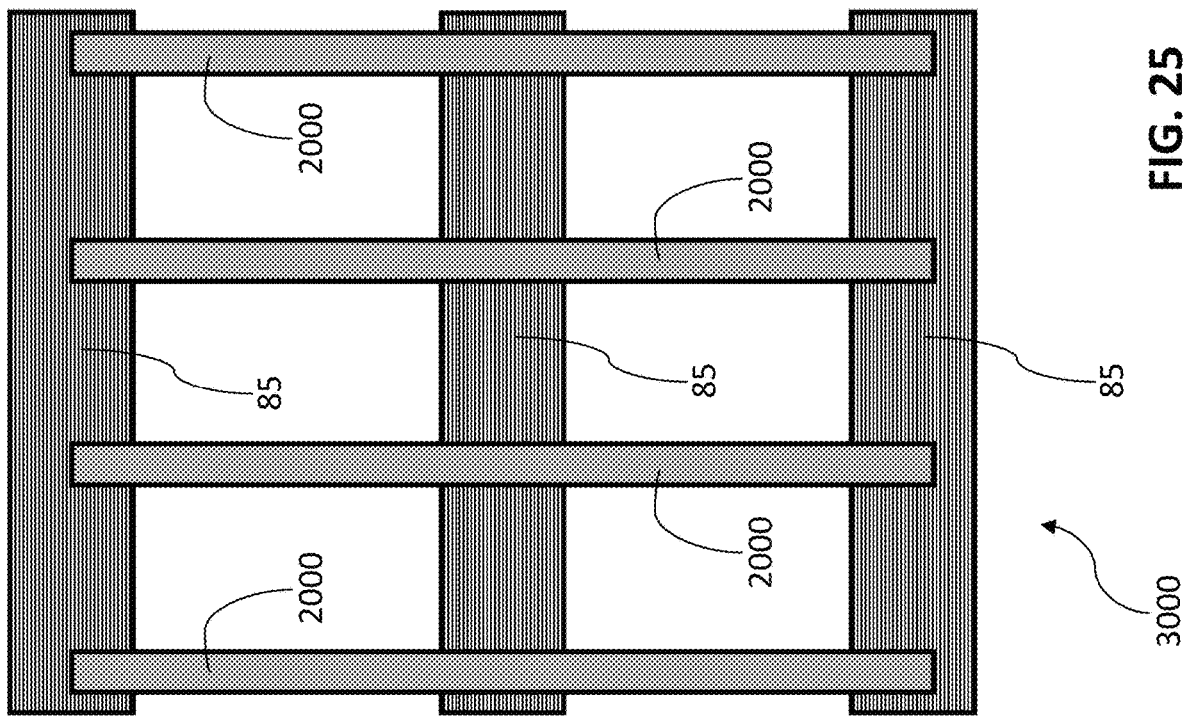
FIGS. 24 and 25 are top and bottom plan views, respectively, of another example of implementation of inventive vibration damping/isolation combinations such as shown in FIG. 22.
Figure 24:
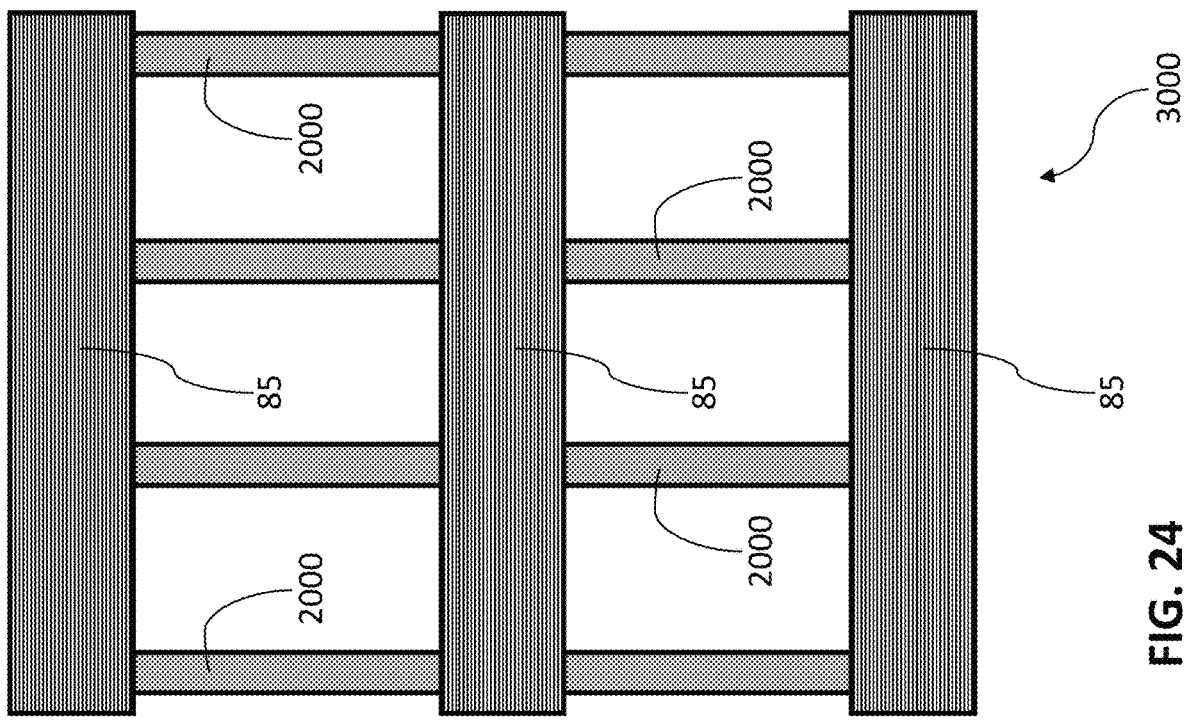

With reference to FIGS. 22 through 25, according to a second mode of inventive practice the present invention acts as a vibration isolator and damper for a vibrating system that is mounted to a foundation. FIG. 22 shows an example, in accordance with the present invention, of a concentric two-axis vibration isolator and damper. FIGS. 23 through 25 show examples, in accordance with the present invention, of implementation of an inventive isolator and damper such as shown in FIG. 22.

For instance, a reciprocating machine 80 may be attached to a bedplate 85 and then attached to a massive foundation 90. According to common practice, this attachment is effected through conventional single-axis vibration mounts having a vertically oriented primary axis. A similar but advantageous installation can be inventively achieved by providing a mount arrangement that includes at least one inventive isolation assembly such as isolation mount 2000 shown in FIG. 22. Each inventive isolation mount 2000 is characterized by inventive concentricity and includes an inner cylinder 50, an outer cylinder 60, and at least one inventive isolation/damping unit 1000. Each inventive isolator 2000 acts as a mount for a vibrating baseplate, where there is limited movement expected along the long axis of the inventive isolator.

Particularly referring to FIG. 23, bedplate 85 may be engineered to engage the respective inner cylinders 50, and the respective outer cylinders 60 may attach to the foundation 90 through massive hardware. Alternatively, bedplate 85 may be engineered to engage the respective outer cylinders 60, and the respective inner cylinders 50 may attach to the foundation 90 through massive hardware. Because of the radial design of the present invention's concentric mount 2000, it provides isolation on both the vertical and lateral axes, and on any combination of this axis pair.

Rigid elements 101 and 102 may each be made of practically any type of non-resilient (stiff) material suitable for the cylindrical structure surfaces upon which elements 101 and 102 respectively bear. Rigid elements 101 and 102 may be made of the same material or different materials, and may be metallic (metal or alloy), composite, polymeric, etc. Regardless of the materials chosen for the rigid elements and for the resilient elements, the rigid elements should be much stiffer than the resilient elements. If elements 101 and 102 are made of a viscoelastic material, they must be substantially stiffer in shear than element 103 so that the majority of shear strain occurs in the isolating/damping element 103. Resilient elements 103 may be composite, polymeric, natural rubber, etc., and if plural in number may be made of the same material or different materials. According to most inventive embodiments, the cylindrical structures 50 and 60 will each be made of a metal (e.g., aluminum or copper) or metal alloy (e.g., steel or copper alloy) or composite or other hard material that typify parts and components of diverse types of machinery and mechanical systems.

In a given application, a practitioner of the present invention should select the material composing resilient element 103 in accordance with shear modulus and loss factor properties suitable for expected system vibration frequencies and structural loading, and for temperatures at which the system is expected to operate. The adhesive that bonds together elements 101, 102, and 103 should have a shear stiffness significantly greater than that of element 103 so that the majority of shear strain occurs in the elements 103 rather than in the adhesive layers 400.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A vibration isolation and damping device for use in association with two concentric cylindrical structures, said concentric cylindrical structures being an inner cylindrical structure and an outer cylindrical structure, the vibration isolation and damping device comprising at least three coaxially adjacent toroidal elements, said elements being at least one inwardly contiguous non-resilient element, at least one outwardly contiguous non-resilient element, and at least one noncontiguous resilient element, each said noncontiguous resilient element being coaxially interposed between and attached to a said inwardly contiguous non-resilient element and a said outwardly contiguous non-resilient element, wherein the vibration isolation and damping device is capable of being concentrically combined with said two concentric cylindrical structures so that said inwardly contiguous non-resilient element is contiguous to said inner cylindrical structure, said outwardly contiguous non-resilient element is contiguous to said outer cylindrical structure, and said noncontiguous resilient element is contiguous to neither said inner cylindrical structure nor said outer cylindrical structure.

2. The vibration isolation and damping device of claim 1, wherein each said element is characterized by a rectangular toroidal geometric shape.

3. The vibration isolation and damping device of claim 2, wherein:
said inner cylindrical structure is characterized by an outside circumferential cylinder surface;
said outer cylindrical structure is characterized by an inside circumferential cylinder surface;
said inwardly contiguous non-resilient element is characterized by an inside circumferential element surface;
said outwardly contiguous non-resilient element is characterized by an outside circumferential element surface;
the vibration damping device is capable of being coaxially combined with said two coaxial cylindrical structures so that said inside circumferential element surface adjoins said outside circumferential cylinder surface, and so that said outside circumferential element surface adjoins said inside circumferential cylinder surface.

4. The vibration isolation and damping device of claim 3, wherein:
said inside circumferential element surface and said outside circumferential cylinder surface are characterized by a first circumference;
said outside circumferential element surface and said inside circumferential cylinder surface are characterized by a second circumference;
said second circumference is greater than said first circumference.

5. A vibration isolator and damper comprising two concentric cylindrical structures and at least three coaxially adjacent toroidal elements, said concentric cylindrical structures being an inner cylindrical structure and an outer cylindrical structure, said elements being at least one inwardly contiguous non-resilient element, at least one outwardly contiguous non-resilient element, and at least one noncontiguous resilient element, each said noncontiguous resilient element being coaxially interposed between and attached to a said inwardly contiguous non-resilient element and a said outwardly contiguous non-resilient element, wherein said at least three coaxially adjacent toroidal elements are concentrically combined with said two concentric cylindrical structures so that said inwardly contiguous non-resilient element is contiguous to said inner cylindrical structure, said outwardly contiguous non-resilient element is contiguous to said outer cylindrical structure, and said noncontiguous resilient element is contiguous to neither said inner cylindrical structure nor said outer cylindrical structure.

6. The vibration isolator and damper of claim 5, wherein:
each said element is characterized by a rectangular toroidal geometric shape;

said inner cylindrical structure is characterized by an outside circumferential cylinder surface;

said outer cylindrical structure is characterized by an inside circumferential cylinder surface;

said inwardly contiguous non-resilient element is characterized by an inside circumferential element surface;

said outwardly contiguous non-resilient element is characterized by an outside circumferential element surface;

said at least three coaxially adjacent toroidal elements are concentrically combined with said two concentric cylindrical structures so that said inside circumferential element surface adjoins said outside circumferential cylinder surface, and so that said outside circumferential element surface adjoins said inside circumferential cylinder surface.

7. The vibration isolator and damper of claim 6, wherein:

said inside circumferential element surface and said outside circumferential cylinder surface are characterized by a first circumference;

said outside circumferential element surface and said inside circumferential cylinder surface are characterized by a second circumference;

said second circumference is greater than said first circumference.

8. A device for effecting vibration isolation and damping, the device comprising a first rigid toroidal member, a second rigid toroidal member, and a resilient toroidal member adjacently and coaxially interposed between said first rigid toroidal member and said second rigid toroidal member, wherein:

the device is suitable for combination with two concentric cylinders, said two concentric cylinders being an inner said cylinder and an outer said cylinder;

said first rigid toroidal member has an inside circumferential first rigid member surface for contacting the inner said cylinder, and an outside circumferential first rigid member surface for being separated from the outer said cylinder;

said second rigid toroidal member has an inside circumferential second rigid member surface for being separated from the inner said cylinder, and an outside circumferential second rigid member surface for contacting the outer said cylinder;

said resilient toroidal member has an inside circumferential resilient member surface for being separated from the inner said cylinder, and an outside circumferential resilient member surface for being separated from the outer said cylinder.

9. The device of claim 8, wherein:

the inner said cylinder is characterized by an inner cylinder outside diameter;

the outer said cylinder is characterized by an outer cylinder inside diameter;

said first rigid toroidal member is characterized by a first rigid member inside diameter and a first rigid member outside diameter;

said second rigid toroidal member is characterized by a second rigid member inside diameter and a second rigid member outside diameter;

said inner cylinder outside diameter and said first rigid member inside diameter are at least approximately equal;

said outer cylinder inside diameter and said second rigid member outside diameter are at least approximately equal.

10. The device of claim 9, wherein:

said resilient toroidal member is characterized by a resilient member inside diameter and a resilient member outside diameter;

said resilient member inside diameter is greater than said inner cylinder outside diameter;

said resilient member outside diameter is less than said outer cylinder inside diameter.

11. The device of claim 10, wherein said resilient toroidal member is made of an elastomeric material, and wherein said first rigid toroidal member and said second rigid toroidal member are each made of the same non-elastomeric material.

12. The device of claim 8 further comprising a second resilient toroidal member and a third rigid toroidal member, wherein:

said resilient toroidal member is a first resilient toroidal member;

said second resilient toroidal member has an inside circumferential resilient member surface for being separated from the inner said cylinder, and an outside circumferential resilient member surface for being separated from the outer said cylinder;

said third rigid toroidal member has an inside circumferential third rigid member surface for being separated from the inner said cylinder, and an outside circumferential third rigid member surface for contacting the outer said cylinder;

said first rigid toroidal member is coaxially interposed between said first resilient toroidal member and said second resilient toroidal member;

said first resilient toroidal member is coaxially interposed situated between said first rigid toroidal member and said second rigid toroidal member;

said second resilient toroidal member is coaxially interposed between said first rigid toroidal member and said third rigid toroidal member.

13. The device of claim 12, wherein:

the inner said cylinder is characterized by an inner cylinder outside diameter;

the outer said cylinder is characterized by an outer cylinder inside diameter;

said first resilient toroidal member and said second resilient toroidal member are each characterized by at least approximately the same resilient member inside diameter and at least approximately the same resilient member outside diameter;

said first rigid toroidal member is characterized by a first rigid member inside diameter and a first rigid member outside diameter;

said second rigid toroidal member and said third rigid toroidal member are each characterized by at least approximately the same second-third rigid member inside diameter and at least approximately the same second-third rigid member outside diameter;

said inner cylinder outside diameter and said first rigid member inside diameter are at least approximately equal;

said outer cylinder inside diameter and said second-third rigid member outside diameter are at least approximately equal;

said resilient member inside diameter is greater than said inner cylinder outside diameter;

said resilient member outside diameter is less than said outer cylinder inside diameter.

14. The device of claim 13, wherein:
said first resilient toroidal member and said second resilient toroidal member are each made of the same elastomeric material and are congruous;
said second rigid toroidal member and said third rigid toroidal member are congruous;
said first rigid toroidal member, said second rigid toroidal member, and said third rigid toroidal member are each made of the same non-elastomeric material.

15. An apparatus for effecting vibration isolation and damping, the apparatus comprising two concentric cylinders and at least one device concentric with and interpositionally connecting said two concentric cylinders, wherein:
each said device includes a first rigid toroidal member, a second rigid toroidal member, and a resilient toroidal member which are joined together, said resilient toroidal member being adjacently and coaxially interposed between said first rigid toroidal member and said second rigid toroidal member, said two concentric cylinders being an inner said cylinder and an outer said cylinder, wherein:
said first rigid toroidal member has an inside circumferential first rigid member surface contacting the inner said cylinder, and an outside circumferential first rigid member surface separated from the outer said cylinder;
said second rigid toroidal member has an inside circumferential second rigid member surface separated from the inner said cylinder, and an outside circumferential second rigid member surface contacting the outer said cylinder;
said resilient toroidal member has an inside circumferential resilient member surface separated from the inner said cylinder, and an outside circumferential resilient member surface separated from the outer said cylinder.

16. The apparatus of claim 15, wherein:
the inner said cylinder is characterized by an inner cylinder outside diameter;
the outer said cylinder is characterized by an outer cylinder inside diameter;
said first rigid toroidal member is characterized by a first rigid member inside diameter and a first rigid member outside diameter;
said second rigid toroidal member is characterized by a second rigid member inside diameter and a second rigid member outside diameter;
said inner cylinder outside diameter and said first rigid member inside diameter are at least approximately equal;
said outer cylinder inside diameter and said second rigid member outside diameter are at least approximately equal;
said resilient toroidal member is characterized by a resilient member inside diameter and a resilient member outside diameter;
said resilient member inside diameter is greater than said inner cylinder outside diameter;
said resilient member outside diameter is less than said outer cylinder inside diameter.

17. The apparatus of claim 15, wherein said resilient toroidal member is made of an elastomeric material, and wherein said first rigid toroidal member and said second rigid toroidal member are each made of the same non-elastomeric material.

18. The apparatus of claim 15 further comprising a second resilient toroidal member and a third rigid toroidal member, wherein:
said resilient toroidal member is a first resilient toroidal member;
said second resilient toroidal member has an inside circumferential resilient member surface for being separated from the inner said cylinder, and an outside circumferential resilient member surface for being separated from the outer said cylinder;
said third rigid toroidal member has an inside circumferential third rigid member surface for being separated from the inner said cylinder, and an outside circumferential third rigid member surface for contacting the outer said cylinder;
said first rigid toroidal member is coaxially interposed between said first resilient toroidal member and said second resilient toroidal member;
said first resilient toroidal member is coaxially interposed situated between said first rigid toroidal member and said second rigid toroidal member;
said second resilient toroidal member is coaxially interposed between said first rigid toroidal member and said third rigid toroidal member.

19. The apparatus of claim 18, wherein:
the inner said cylinder is characterized by an inner cylinder outside diameter;
the outer said cylinder is characterized by an outer cylinder inside diameter;
said first resilient toroidal member and said second resilient toroidal member are each characterized by at least approximately the same resilient member inside diameter and at least approximately the same resilient member outside diameter;
said first rigid toroidal member is characterized by a first rigid member inside diameter and a first rigid member outside diameter;
said second rigid toroidal member and said third rigid toroidal member are each characterized by at least approximately the same second-third rigid member inside diameter and at least approximately the same second-third rigid member outside diameter;
said inner cylinder outside diameter and said first rigid member inside diameter are at least approximately equal;
said outer cylinder inside diameter and said second-third rigid member outside diameter are at least approximately equal;
said resilient member inside diameter is greater than said inner cylinder outside diameter;
said resilient member outside diameter is less than said outer cylinder inside diameter.

20. The apparatus of claim 19, wherein:
said first resilient toroidal member and said second resilient toroidal member are each made of the same elastomeric material and are congruous;
said second rigid toroidal member and said third rigid toroidal member are congruous;
said first rigid toroidal member, said second rigid toroidal member, and said third rigid toroidal member are each made of the same non-elastomeric material.

* * * * *